United States Patent
Lehureau

(10) Patent No.: US 7,187,448 B2
(45) Date of Patent: Mar. 6, 2007

(54) NONRECIPROCAL PHASE SHIFT FIBER-OPTIC GYROMETER

(75) Inventor: Jean-Claude Lehureau, Ste Genevieve des Bois (FR)

(73) Assignee: Thales, Neuilly Sur Seine (FR)

( * ) Notice: Subject to any disclaimer, the term of this patent is extended or adjusted under 35 U.S.C. 154(b) by 200 days.

(21) Appl. No.: 10/477,360

(22) PCT Filed: Apr. 30, 2002

(86) PCT No.: PCT/FR02/01503

§ 371 (c)(1),
(2), (4) Date: Aug. 3, 2004

(87) PCT Pub. No.: WO02/093110

PCT Pub. Date: Nov. 21, 2002

(65) Prior Publication Data

US 2004/0246487 A1 Dec. 9, 2004

(30) Foreign Application Priority Data

May 15, 2001 (FR) .................................. 01 06396

(51) Int. Cl.
*G01C 19/72* (2006.01)

(52) U.S. Cl. ..................................................... 356/464

(58) Field of Classification Search ................ 356/460, 356/462, 464
See application file for complete search history.

(56) References Cited

U.S. PATENT DOCUMENTS 5,116,129 A * 5/1992 Ishigami ..................... 356/464

* cited by examiner

*Primary Examiner*—Gregory J. Toatley, Jr.
*Assistant Examiner*—Patrick Connolly
(74) *Attorney, Agent, or Firm*—Lowe Hauptman & Berner, LLP

(57) ABSTRACT

The present invention relates to a fiber-optic gyrometer including a Sagnac interferometer using two light waves propagating in opposite directions in a interferometer loop including a photodetector which delivers an electrical signal Ud representing the light intensity of the interference between the two waves, and for optically phase-shifting the waves controlled by a square-wave modulation signal Um suitable for controlling an optical phase variation at a frequency FO substantially equal to $1/(2t_o)$, where $t_o$ is the propagation time of a wave through the guide. The photodetector is connected to at least a first sampling circuit and a second sampling circuit which are controlled in phase opposition by a clock. The gyrometer includes a means for inverting the phase of the clock at a frequency f, which is very much less than the frequency FO.

20 Claims, 4 Drawing Sheets

NONRECIPROCAL PHASE SHIFT FIBER-OPTIC GYROMETER

The present invention relates to fiber-optic gyrometers and, more particularly, to a device for measuring a nonreciprocal phase shift generated in an optical ring interferometer of the gyrometer, also referred to as a Sagnac interferometer.

Such an interferometer principally includes a source of light energy, generally consisting of a laser, an optical device consisting either of a certain number of mirrors or of an optical fiber coiled on itself, this device forming an interferometer loop; a device for splitting and mixing of the light and a device for detection and for processing of the detected signal.

It is known that, in these interferometers, there are two waves which originate from the splitter device and travel in opposite directions along the same optical path.

One fundamental property of ring interferometers is reciprocity, which can be expressed as follows: any perturbation of the optical path affects both waves similarly, even though these two waves do not experience it at exactly the same time or in the same sense.

There are however, two types of perturbations which violate reciprocity.

These are, on one hand, perturbations which vary in the course of time, and do so on a time scale comparable with the time that the waves take to propagate along the optical path of the interferometer; and, on the other hand, so-called "non-reciprocal" perturbations, that is to say perturbations which do not have the same effect on the waves depending on whether they are propagating along the optical path in one direction or in another. These are physical effects which break the symmetry of the medium through which the waves are propagating.

Two known effects exhibit the latter type of perturbation:
the Faraday effect, or collinear magneto-optical effect, by which a magnetic field creates a preferential orientation of the spin of the electrons of an optical material;
and the Sagnac effect, or relativistic inertial effect, in which the rotation of the interferometer with respect to a Galilean reference frame breaks the symmetry of the propagation time. This effect is employed to produce gyrometers in particular.

Without the manifestation of "non-reciprocal" perturbations, the phase difference (which will be referred to below as $\Delta\phi$) between the two waves, which are recombined in the splitting and mixing device after having traveled along the optical path, is zero. The detection and processing device detects signals representing the optical power of the composite wave obtained after recombination. This power can be resolved into two components in the interferometers of the prior art:

a constant component and a component proportional to cos $(\Delta\phi)$, this component existing only when "non-reciprocal" perturbations occur.

If the intent is to measure small-amplitude perturbations, for example low speeds of rotation in the case of gyrometers, the component containing the term in cos $(\Delta\phi)$ varies little since the phase shift is close to zero.

It is then necessary to artificially introduce a fixed additional phase shift, or "non-reciprocal bias", in order to increase the sensitivity of the measurement. One particularly interesting case is that in which the new measured phase shift is $\Delta\phi'=\Delta\phi+\pi/2$.

In this case, the sensitivity is a maximum since the term to be measured is proportional to cos $(\Delta\phi+\pi/2)$, i.e. to sin $(\Delta\phi)$.

Although attractive, this method is confronted with implementation difficulties and, in particular, the ability to produce a device which introduces a "non-reciprocal bias" that is sufficiently stable to be usable.

The instability of these devices is in general of the same order of magnitude as the variations of the quantity to be measured.

In order to overcome these drawbacks, Patent FR-B-2 471 583 has thus proposed a phase modulation of the waves which propagate through the ring, alternately by $+\pi/2$ and $-\pi/2$ radians.

This method is based on the property which the Sagnac interferometer has of producing the equivalent of a discrete time derivation.

Specifically, when a phase modulation is produced at one end of the fiber loop, one of the waves experiences the modulation at the time when it is produced, while the other wave experiences it with a delay equal to the propagation time through the fiber. This propagation time satisfies the relation: $t_o = nl/c$, in which n is the refractive index of silica, l is the length of the fiber and c is the velocity of light in a vacuum. The "natural frequency" of the interferometer is $1/(2/t_o)$ and represents the modulation frequency at which both waves experience two phase shifts in phase opposition. The phase shift between the two optical waves is therefore equal to the difference $S(t)-S(t)-t_o)$, where $S(t)$ is the signal applied to the phase modulator. It can therefore be seen that, if the half-period of the modulation signal is $t_o$, the phase shift at the output of the interferometer is equal to two times the applied phase shift. It is this method which is used to create the bias giving the working point of the interferometer.

Added to this phase shift is a phase shift $\Delta\phi_o$ due to the non-reciprocal effect, in the case in point due the rotation if it is non-zero.

It is possible to process the signals directly and measure the component in cos $(\Delta\phi+\pi/2)$.

A more precise method, which avoids the errors due to possible drifts of the various elements being used, for example the opto-electronic elements, consists in an indirect method or "zero method". According to this method, this difference of the phase shift from $\pm\pi/2$ radians is compared by generating an additional phase shift, which is equal in absolute value to the amplitude of the phase shift due to the non-reciprocal effect and has an opposite sign, so as to cancel it out.

In order to do this, it is not in practice possible to use the same physical effect as the one which produces the non-reciprocal effect, in the case in point altering the rotation.

Electrical means are employed in order to generate a feedback signal. It is assumed that greater control can be obtained over these electrical means than over the other elements of the interferometer, which is confirmed by experience.

The purpose of this feedback is to create a phase shift between the two waves which is constantly equal and of opposite sign to that induced by the speed of rotation. If the speed is constant and creates a phase shift $\Delta\phi$, it is therefore necessary for the instantaneous value of the phase modulation to have varied by $(\Delta\phi_o + 2\pi n)$ radians between two times separated by t, n being an integer. This is therefore the equivalent of an integral of the velocity. One procedure is to generate a phase "ramp" with a slope proportional to $(\Delta\phi/t_o)$.

This method, however, entails two separate operations: the phase modulation and the generation of a feedback signal. Furthermore, the factor of proportionality or scale factor is not related to the one employed for the modulation by $\pm(\pi/2)$ radians.

Furthermore, the phase "ramp" cannot be infinite, that is to say the signal, which consists in practice of a control voltage of a phase modulator, cannot increase above a specific threshold.

One usable method is to generate sawtooth phase-shift control signals with a peak-to-peak amplitude of $2\pi$ radians, the mathematical functions involved being periodic and having a period of $2\pi$ radians. This leads the problem of precisely determining this phase-shift amplitude equal to $2\pi$ radians.

The phase "ramp" consists of a digital signal. The phase modulation, which is also in digital form, and this phase "ramp" are combined to form a single signal, and converted into an analog control signal for a phase modulator arranged in the ring.

An interferometer operating on this principle is described in Patent FR 2 566 133. However, the interferometer described in Patent FR 2 566 133 contains electronic circuits, for processing the detected optical power, which introduce drifts that falsify the rotation measurement in the long term. Gyrometers are very sensitive to the drifts since rotations are measured over long times. Any drift of the electronic circuits can lead to a time-integrated signal drift. In order to avoid these drifts, it has already been proposed to digitize the signal immediately at the output of the photodetector, and subsequently to process everything digitally, but this technique has the drawback of requiring an analog/digital converter that has a very large dynamic range.

In order to overcome the drawbacks of the prior art which have just been described, the invention provides a fiber-optic gyrometer comprising a Sagnac interferometer using two light waves propagating in opposite directions in a interferometer loop, comprising a photodetector which delivers an electrical signal representing the light intensity of the interference between the two waves, and means for optically phase-shifting the waves controlled by a square-wave modulation signal suitable for controlling an optical phase variation at a frequency FO substantially equal to $1/(2t_o)$, where $t_o$ is the propagation time of a wave through the guide, the photodetector being connected to at least a first sampling circuit and a second sampling circuit which are controlled in phase opposition by a clock with frequency FO and provide two samples in each period, respectively on a first input and a second input of a differential amplifier, an analog-digital converter at the output of the differential amplifier and an adder/subtractor for accumulating the digital values successively provided by the analog-digital converter, the adder/subtractor providing a content representing a parameter of the rotation measurement of the gyrometer, characterized in that a means is provided for inverting the phase of the clock at a frequency f, which is very much less than the frequency FO, so as to alternate the sense of the difference of samples at the output of the differential amplifier at the frequency f, and in that the adder/substractor is also controlled by the frequency f in order to function alternately as an adder or as a subtractor.

The invention will be understood more clearly, and other advantages will become apparent, with the aid of the following description and the appended drawings, in which.

It is firstly useful to recall the principal phenomena involved in a ring interferometer of the Sagnac type, as well as the modulation method taught by the aforementioned Patent FR-B-2 471 583.

Figure 1:
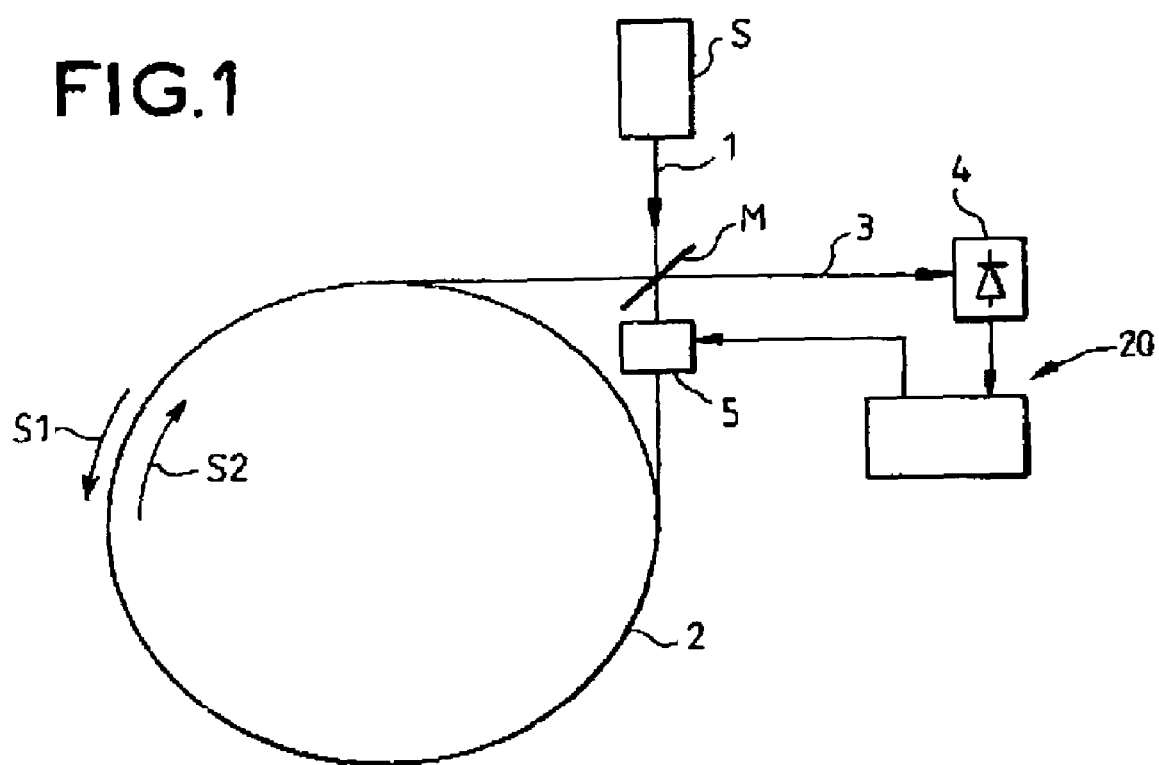
FIG. 1 represents a ring interferometer of the prior art.

FIG. 1 schematically illustrates the architecture of a ring interferometer as described in that patent.

A laser source S produces a beam of parallel rays 1 in the direction of a splitter device consisting, for example, of a plate or a semitransparent mirror M optically coupled to the ring 2 of the interferometer. This ring 2 may be produced, for example, with the aid of a single-mode fiber coiled on itself. The reason is that the sensitivity of the measurement is increased owing to the use of a long optical path, which is proportional to the number of turns. This ring 2 is looped back onto the splitter device M, which also fulfils the role of a mixer device and thus defines an output branch 3. Two waves propagating in opposite directions therefore travel through the ring: one in the clockwise direction S1 and the other in the counterclockwise direction S2. These two waves are recombined on the splitter plate M. The result of this recombination can be observed in the output branch 3 with the aid of the photodetector 4.

Let $\Delta\phi_o$ be the phase difference between the two waves propagating in opposite directions in the ring, and let $P_S$ be the output optical power which can be measured in the output branch 3. In the absence of any "non-reciprocal" perturbation, $\Delta\phi_o$ is zero.

If, by way of nonlimiting example, a gyrometer employing a ring interferometer is considered, a "non-reciprocal" perturbation will be created by the rotation of the gyrometer. The phase difference is no longer zero, and $\Delta\phi_o = \alpha\Omega$, where $\Omega$ is the speed of rotation and $\alpha = kL/\lambda C$, where k is a constant that depends on the geometry of the gyrometer, L is the length of the optical path, $\lambda$ is the wavelength of the light emitted by the laser source, and C is the velocity of light in the ring 2. When the speed of rotation $\Omega$ increases, the phase difference $\Delta\phi_o$ increases proportionately because the coefficient $\alpha$ remains constant. The optical power $P_S$ changes according to a cosinusoidal law. Specifically:

$P_S = P_{1S} + P_{2S} + 2P_{1S}P_{2S}\cos(\Delta\phi_o)$; in which relation the component $P_{1S}$ corresponds to the direction S1 and the component $P_{2S}$ corresponds to the direction S2. The sensitivity of the measurement for a given value $\Delta\phi$ is expressed by the derivative of $P_S$:

$$dP_S/d(\Delta\phi_o) = -2P_{1S}P_{2S}\sin(\Delta\phi_o).$$

Figure 2:
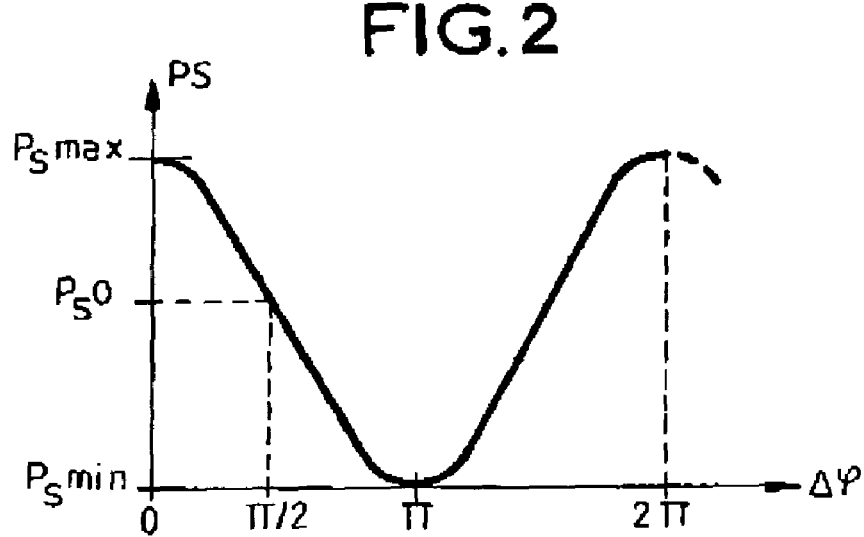
FIG. 2 represents the variation of the optical power $P_S$ in an output branch of the interferometer in FIG. 1.

The sensitivity of the interferometer is very low if the phase difference $\Delta\phi$ differs little from zero. This is the case in a gyrometer if the intent is to measure low speeds of rotation $\Omega$. The variation of the optical power $P_S$ in the output branch as a function of the phase difference $\Delta\phi$ is illustrated by the diagram in FIG. 2.

The terms $P_{1S}$ and $P_{2S}$ may be assumed to be equal. This means that the detected power is a minimum for a phase difference $\Delta\phi = \pi$ radians. It passes through a maximum at $\Delta\phi = 0$ and at $2\pi$ radians, and so on.

In order to increase the sensitivity of the interferometer, a constant "non-reciprocal bias" may be introduced into the phase of the two waves propagating in opposite directions, so as to move the working point of the interferometer.

In the case of a function which varies according to a cosinusoidal law, the point of highest sensitivity is obtained by the angles $(2n+1)\pi/2$ radians, with n being an integer. A bias may therefore be selected which introduces a phase variation for each wave with an absolute value of $\pi/4$ radians but with opposite signs. In the absence of any "non-reciprocal" perturbation, the phase difference is then at the point $P_{SO}$ in FIG. 2.

According to the teaching of the aforementioned French patent, a phase modulator 5 incorporating a reciprocal effect is introduced into the path of the waves through the ring 2. The phase modulator 5 (FIG. 1) is stimulated so as to create a phase variation $\Phi(t)$ of the wave which passes through it. This variation is periodic, its period being equal to $2t_o$, $t_o$ being the propagation time of a wave in the ring.

Figure 3:
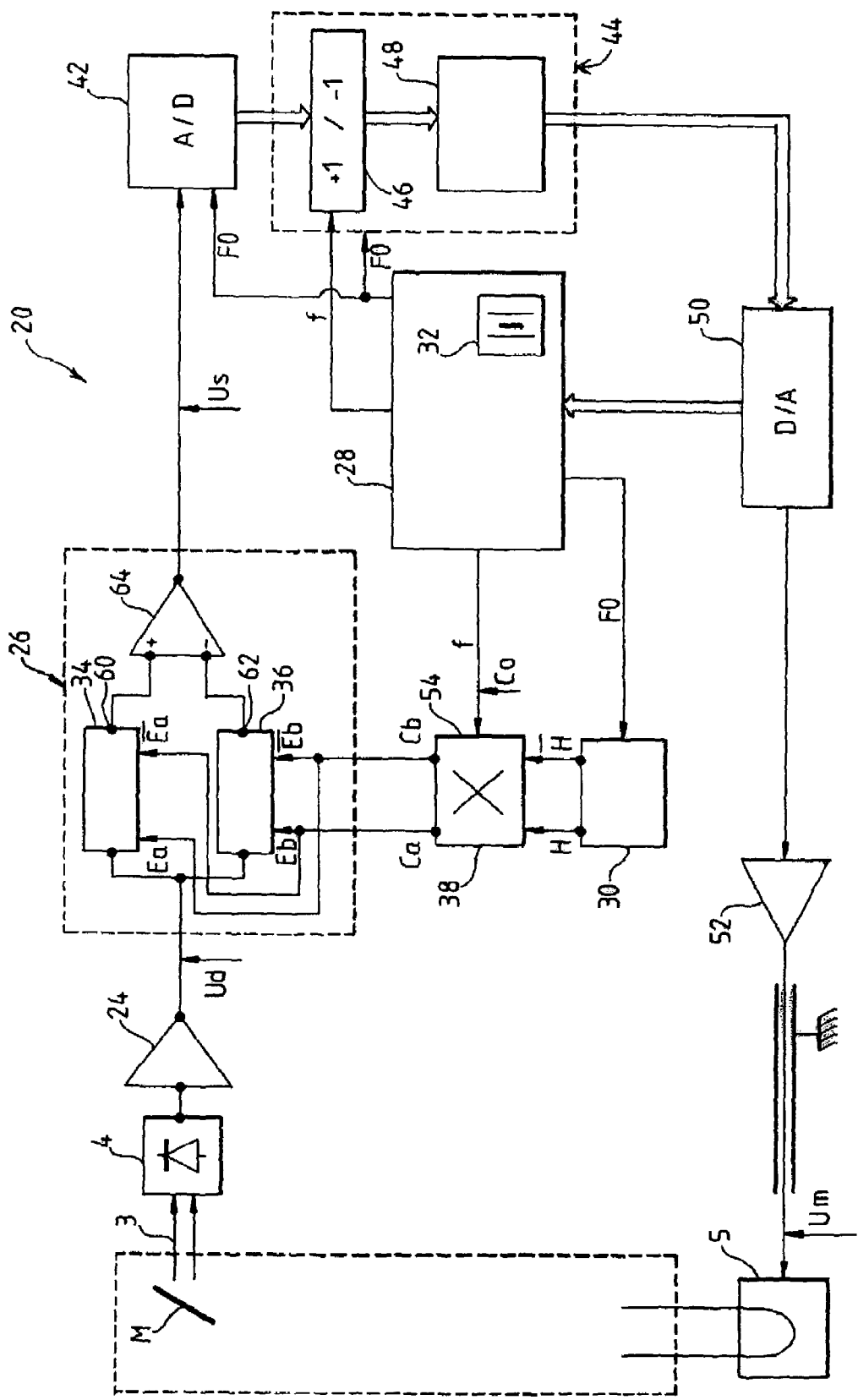
FIG. 3 represents a block diagram of a gyrometer according to the invention.

FIG. 3 represents the architecture of a gyrometer according to the invention, employing the ring interferometer in FIG. 1.

An electronic device 20 for operating the interferometer receives electrical information from the photodetector 4 optically coupled to the channel 3, at the output of the splitter plate M of the interferometer in FIG. 1, and provides a modulation signal Um to the phase modulator 5 introduced into the ring 2 of said interferometer.

The photodetector 4 converts the output optical intensity of the mixer device M (splitter plate M) into an electrical voltage Ud which is applied, through an amplifier 24, to a synchronous detection circuit 26 driven by two additional control signals Ca and Cb with the modulation frequency $FO=1/(2t_o)$.

A processor 28 manages all of the electronic operating device 20 of the gyrometer according to the invention. The control signals Ca and Cb needed for controlling the synchronous detector 26 may, for example, be copies of the pulse signals of a clock 30 driven by a quartz oscillator 32 of the processor 28.

The synchronous detector 26 essentially includes a first sample/hold circuit 34 and a second sample/hold circuit circuit 36 which are controlled by the clock 30, through an invertor 38 of the complementary logical states H and $\overline{H}$ provided by the clock 30, so that the output signal Ud of the amplifier 24 is sampled by the first sample-and-hold circuit 34 during one half-period $t_o$ of the phase modulation of the optical signal in one sense, then by the second sample-and-hold circuit 36 during the other, subsequent half-period of the phase modulation of the optical signal in the other sense, the two senses corresponding to the synchronous phase modulations by $+n/2$ and $-n/2$ (sum of the physical phase shifts along S2 by + and $-n/4$ at $T-t_o$ and along S1 by − and $+n/4$ at T).

When the gyrometer is in rotation, the entire curve of the interferometer as a function of the phase shift applied by the modulator is displaced. This produces a modulation of the output voltage Ud of the photodetector with the frequency $FO=1/(2t_o)$, the amplitude of which is proportional to the speed, if the latter is small enough for the phase shift to remain in the linear region of the response curve.

The amplitude of this modulation is extracted by the synchronous detector 26, which provides an analog voltage Us corresponding to the phase variation. The analog voltage Us is applied, after digitizing by an analog/digital converter 42, to a digital control circuit 44 which generates a composite signal for modulation of the phase modulator 5. The analog/digital converter 42 is controlled by a clock with frequency FO.

The purpose of the digital control circuit 44 is to construct a digital ramp and to combine it with the digital phase-modulation signals. To this end, the digital control circuit 44 includes an adder/subtractor 46 which receives, on inputs, the output digital signals of the analog-digital converter 42 and an accumulation instruction with the frequency FO and provides, at an output, digital information to an integrator 48 tasked with producing a digital ramp whose slope is a function of the speed of rotation of the gyrometer.

The digital output of integrator 48 addresses a digital/analog converter 50 which, through a power amplifier 52, generates the analog voltage Um for modulation of the phase-shifter 5 arranged in the path of the light waves of the interferometer.

According to the principal characteristic of the gyrometer according to the invention, the operating device includes a means for inverting the phase of the clock 30 at a frequency f, which is very much less than the frequency FO, so as to alternate the sense of the difference of samples at this frequency f. The adder/subtractor 46 is also controlled by the frequency f in order to function alternately as an adder (+1) or as a subtractor (−1). To this end, the states H and $\overline{H}$ provided by the clock 30 are inverted by the invertor 38, at the rate of the frequency f applied to a control input 54 of the invertor 38.

The sample-and-hold circuits 34, 36 sample the output signal Ud of the amplifier 24 of the photodetector 4. The signal Ud represents the optical power resulting from the interference between the two light waves S1 and S2 propagating through the optical fiber of the interferometer.

Each of the outputs 60, 62 of the sample-and-hold circuits 34 and 36 addresses one or other of the two inputs (+, −) of the differential amplifier 64 which delivers, at its output, the voltage Us representing the difference between two consecutive samples taken during one or other half-period of the frequency of FO of the optical power signal Ud at the output of the photodetector 4.

Each of the sample-and-hold circuits of the synchronous detector has control inputs Ea, $\overline{Ea}$ and Eb, $\overline{Eb}$ driven by the clock 30 through the invertor 38, as described below. The output Ca of the invertor is connected respectively to the input $\overline{Ea}$ of the first sample-and-hold circuit 34 and to the input Eb of the second 36, and the output Cb of the invertor 38 is connected to the input Ea of the first sample-and-hold circuit 34 and to the input $\overline{Eb}$ of the second; hence, in the known way, the sample which is held is the analog value present at the input on the leading edges, for example, of the inputs Ea and Eb. The signal presented to the input of the analog/digital converter 42 when controlling the analog/digital conversion is the difference between the values sampled during the last leading edges of the signals at the inputs Ea and Eb.

The invertor 38 receives through its control input 54 an inversion control signal Co with the frequency f, which has a high state during a half-period of duration $\frac{1}{2}.f$ then a low state during the subsequent half-period of the same duration. The states H and $\overline{H}$ are thus transmitted respectively to the outputs Ca and Cb of the invertor 38 when the inversion control signal is in the high state, for example, the output Ca transmitting the state H of the clock and the output Cb transmitting the state $\overline{H}$, and the states H and $\overline{H}$ are inverted at the outputs Ca and Cb of the invertor 38 when the inversion control signal is in the low state, the output Ca transmitting the state $\overline{H}$ of the clock and the output Cb transmitting the state H.

During the high state of the control signal Co of the invertor 38, the differential amplifier 64 presents a voltage at its output corresponding to a sequence of differences of two consecutive samples $A_p$ and $B_{(p+1)}$ taken respectively during one or other modulation phase of the light signals (+n/2 and −n/2). The output signal Us of the differential amplifier, representing the difference of the samples ($A_p$−$B_{(p+1)}$) during a period 2to $2t_o$, is applied to the adder/subtractor 46 after digitizing by the analog/digital converter 42.

While the control signal of the invertor 38 is in the high state, the adder/subtractor 46 is controlled by the processor 28 so as to carry out positive accumulation (+1).

When the control signal of the invertor changes from the high state to the low state, the states H and H̄ are inverted at the outputs Ca and Cb of the invertor 26, the output Ca transmitting the state H̄ of the clock and the output Cb transmitting the state H, inverting the logical states at the respective inputs Eb and Ēb Ea and Ēa of the sample-and-hold circuits. The samples taken by the first sample-and-hold circuit 34, when the control signal Co of the invertor was in the high state during a phase variation of the light signals in one sense, are taken by the second sample-and-hold circuit 36 when the control signal Co of the invertor 38 is in the low state, and vice versa. Since the difference of the output samples of the differential amplifier changes sign, the processor 28 inverts the control of the adder/subtractor 46 in order to carry out negative accumulation (−1) and hence keep the same sense of the phase ramp.

Figure 4A:
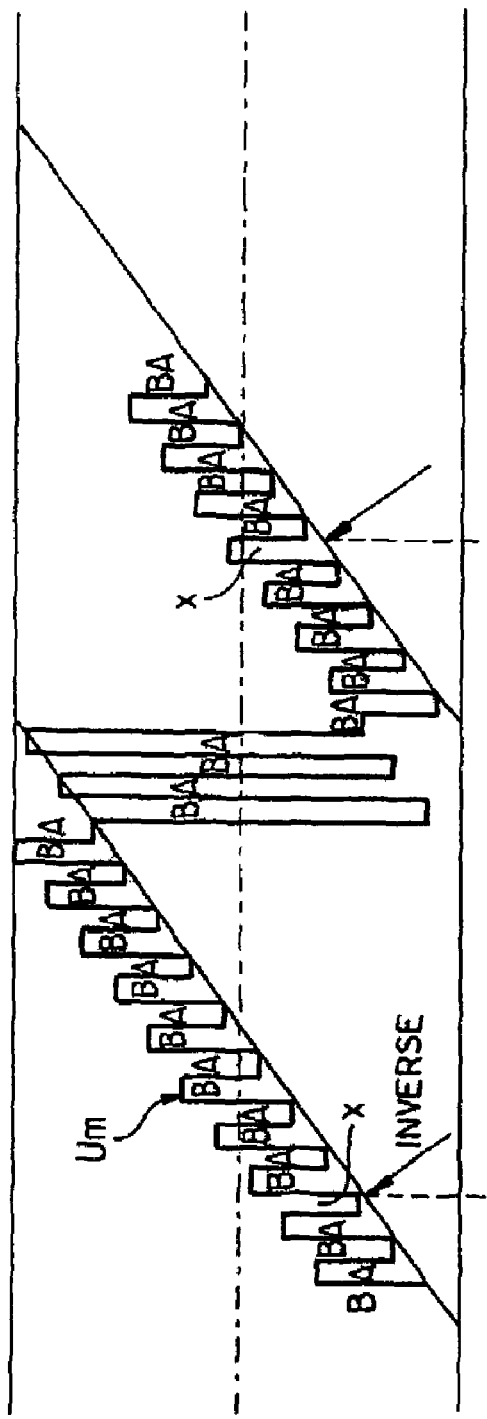
FIG. 4a represents a modulation signal Um of the phase modulator of the gyrometer in FIG. 3.
Figure 4B:
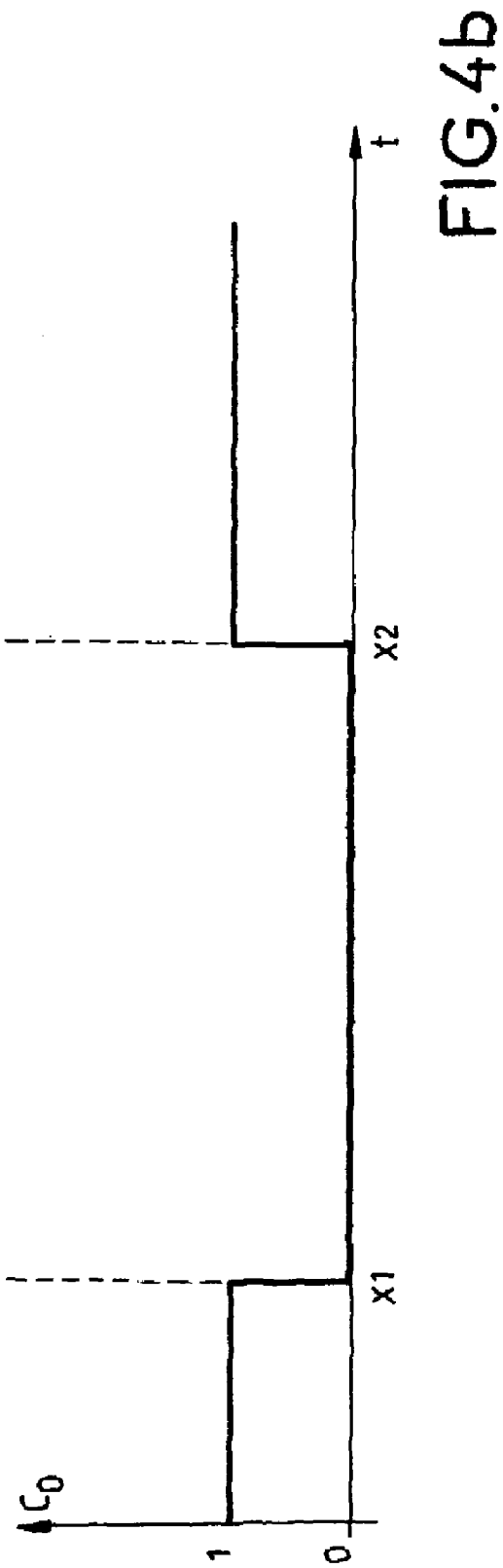
FIG. 4b represents the control signal of an invertor of the complementary states of a clock of the gyrometer in FIG. 3.

FIG. 4a represents a modulation signal Um of the phase modulator 5 of the gyrometer in FIG. 3 according to the invention, and FIG. 4b represents the control signal Co of the state invertor of the clock 30.

The modulation signal Um applied to the phase modulator 5 generates the phase ramp, with a slope proportional to ($\phi_o/t_0$) and a peak-to-peak amplitude equal to $2\pi$ radians, which is combined with the phase modulation signal $+\pi/2$ and $-\pi/2$ with the frequency $\frac{1}{2}.t_0$.

In FIG. 4a, the samples taken by the first sample-and-hold circuit 34 are identified by the letter A and those taken by the second sample-and-hold circuit 36 are identified by the letter B.

Assuming that the control signal Co of the invertor is in the high state (state 1 in the figure) before an instant x1 during the phase ramp, the samples A are taken during the half-period of duration $t_o$ giving rise to a phase modulation by $+\pi/4$, and the samples B are taken during the other half-period giving rise to $-\pi/4$ phase modulation. After the instant x1, the control signal Co of the invertor changes state, entering the low state (state 0 in FIG. 4b) inverting the way in which the samples are taken, the samples A then being taken during the half period of duration $t_o$ giving rise to a phase modulation by $-\pi/4$, and the samples B being taken during the other half-period giving rise to $+\pi/4$ phase modulation.

The role of this alternation function is to abruptly invert the synchronous detection phase and simultaneously alternate the sign of the addition function of the first accumulator of the signal coming from the analog-digital converter.

The adder/subtractor 46 will thus, for example, perform the following addition:

(A1−B2)+(A3−B4)+ . . . (A997−B998)−(1000−B1001) . . . −(A1998−B1999)+(A2001−B2002)+ . . .

With a positive sign for the difference and positive accumulation (+1) from A1 to B998, then a sign change of the difference, which becomes negative, and negative accumulation (−1) from A1000 to B1999, then another sign change of the difference, which becomes positive, and positive accumulation (+1), and so on.

The slaving function is not modified since the sign of the phase error signal accumulated in the first accumulator is not affected by the double inversion. Only the sign of the error of the offset of the voltages of the electronics is alternated because this error is not modified by the first inversion (phase inversion), while it is by the second inversion (of sign).

The operation sequence carried out by the adder/subtractor 46 shows that one sample x of the signal Ud has been omitted at each transition of the clock f. The average rate of the operations of the adder/subtractor 46 is equal to FO−f. In the event of rotation with constant sign, this may entail a systematic error with a relative value of f/FO. In order to correct this error, the average value of addition/subtraction preceding the transition of the clock f may be stored, and half of this average value may be added/subtracted by an additional circuit or logical operator in order to compensate for the missing half-sample.

The operating device of the gyrometer according to the invention also makes it possible to use analog-digital conversion that is not necessarily at the frequency of the optical phase modulation, which reduces the power consumption of the electronics, improves the noise immunity and compensates for the offset defects of the analog part of the electronics, especially the voltage offsets of the differential amplifiers.

Patent FR 8409311 proposes to correct the scale factor of the phase ramp by comparing two modes of operation, corresponding to the phase shifts $\pi/2$ and $3\pi/2$, of the phase modulator.

Figure 5:
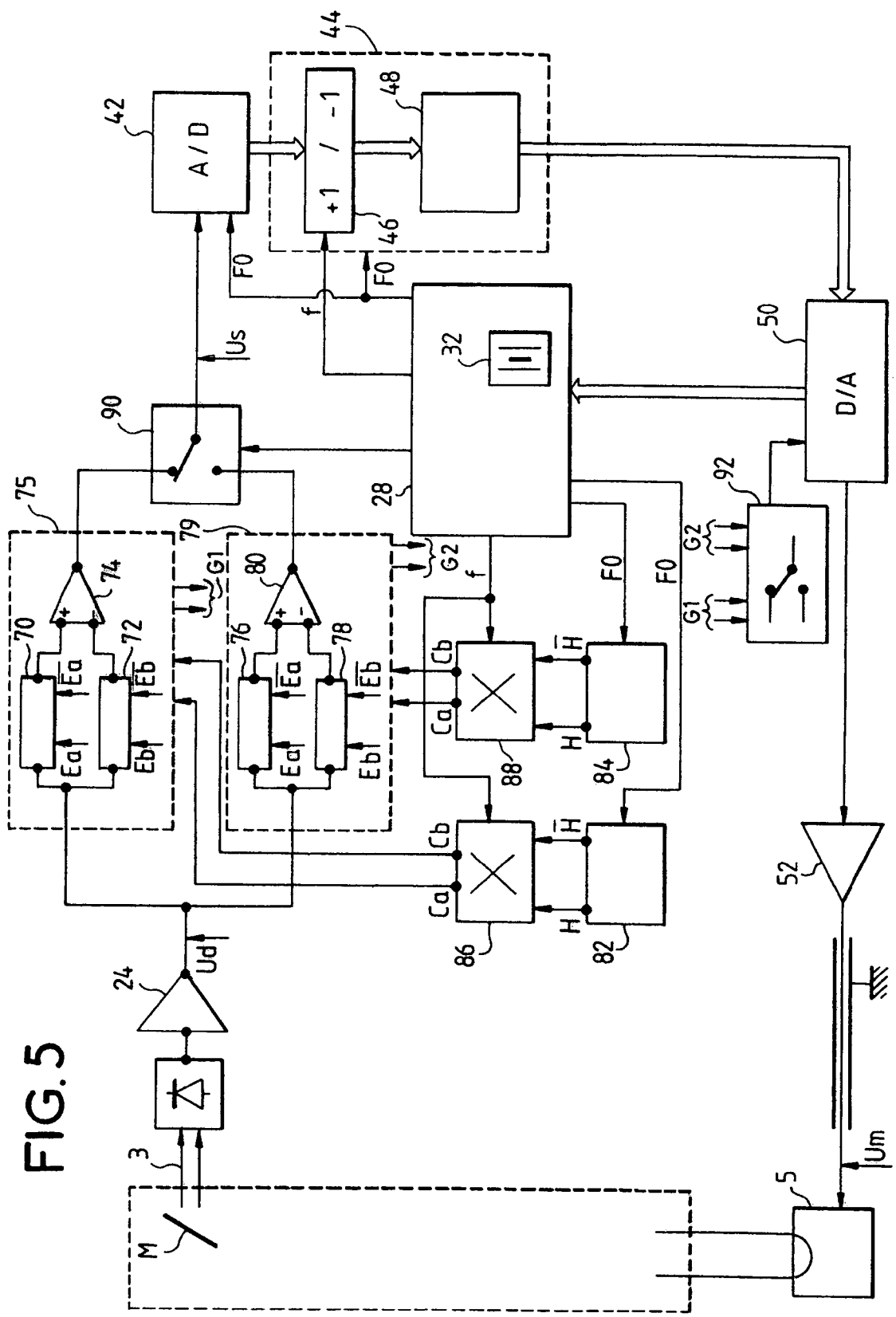
FIG. 5 shows a variant of the gyrometer in FIG. 3 according to the invention, which corrects the scale factor of the phase ramp controlling the modulator.

FIG. 5 shows the layout of a variant of the gyrometer in FIG. 3 according to the invention, which corrects the scale factor of the phase ramp of the phase modulator 5.

In this variant, the operating device of the gyrometer includes four sample-and-hold circuits. A first group of two sample-and-hold circuits 70, 72 addresses the two inputs of a first differential amplifier 74, the assembly forming a first synchronous detector 75, the first differential amplifier 74 providing the difference of the samples taken by the first group of sample-and-hold circuits.

A second group of two other sample-and-hold circuits 76, 78 addressed the two inputs of a second differential amplifier 80, the assembly forming a second synchronous detector 79, the second differential amplifier providing the difference of the samples taken by the second group of sample-and-hold circuits.

The first and second groups of sample-and-hold circuits are respectively driven by a first clock 82 and a second clock 84 through respective invertors 86, 88 of the states of the clocks, according to the operation described for the case of the gyrometer in FIG. 3.

The first and second groups of sample-and-hold circuits operate as synchronous detectors in the same way as for the case of the gyrometer in FIG. 3 described above. To this end, the processor 28 simultaneously controls the following, depending on whether it is operating with a phase modulation interval of $\pi/2$ or $3\pi/2$:

- a first switch 88 which selects either the output of the first differential amplifier 74 of the first group of sample-and-hold circuits, or the output of the second differential amplifier 80 of the second group of sample-and-hold circuits, in order to address the analog-digital converter 42 of the electronic operating device;
- the clock 82, 84 and the state invertor 86, 88 which are associated with the selected group of sample-and-hold circuits;

a second switch 92, of the same type as the first switch 88, which provides information to the digital/analog converter 50 on the basis of the output information G1 and G2 of the first and second groups of sample-and-hold circuits.

The invention claimed is:

1. A fiber-optic gyrometer, comprising:
   a Sagnac interferometer using two light waves propagating in opposite directions in an interferometer loop;
   a photodetector which delivers through an adaptor an electrical signal Ud representing the light intensity of the interference between the two light waves;
   phase modulator means for optically phase-shifting the light waves controlled by a square-wave modulation signal Um suitable for controlling an optical phase variation at a frequency FO substantially equal to $1/(2t_o)$, where $t_o$ is the propagation time of a light wave through the interferometer loop, the photodetector being connected to a first sampling circuit and a second sampling circuit which are controlled in phase opposition by a clock with a frequency FO and provide two samples in each period, respectively, on a first input and a second input of a differential amplifier;
   an analog-digital converter at the output of said differential amplifier; and
   an adder/subtractor for accumulating the digital values successively provided by the analog-digital converter, said adder/subtractor providing a content representing a parameter of the rotation measurement of the gyrometer;
   means for inverting the phase of the clock at a frequency f, which is very much less than the frequency FO, so as to alternate the sense of the difference of samples at the output of the differential amplifier at the frequency f, the adder/subtractor being also controlled by the frequency f so that the adder/subtractor works alternately in adder or in subtractor.

2. The fiber-optic gyrometer as claimed in claim 1, wherein the modulation amplitude of interference between the two waves is extracted by a synchronous detector formed by the first sampling circuit and the second sampling circuit connected respectively to the first input and the second input of the differential amplifier to provide an analog voltage Us corresponding to the phase variation between the waves, the analog voltage Us being applied, after digitizing by the analog/digital converter, to a digital control circuit including the adder/subtractor which receives, on inputs, the output digital signals of the analog-digital converter, and provides at an output, digital information to an integrator and that generates a composite signal for modulation of the optical phase-shifting means, said digital control circuit constructing a digital ramp combined with the digital phase-modulation signals.

3. The fiber-optic gyrometer as claimed in claim 2, further including a synchronous detection circuit driven by two complementary control signals Ca and Cb with the modulation frequency $FO=1/(2t_o)$, the synchronous detector including a first sample-and-hold circuit and a second sample-and-hold circuit which are controlled by the clock, through an invertor of the complementary logical states H and $\overline{H}$ provided by the clock, so that the output signal Ud of the adaptor is sampled by the first sample-and-hold circuit during one half-period $t_o$ of the phase modulation of the optical signal one half-period $t_o$, then by the second sample-and-hold circuit during the other, subsequent half-period of the phase modulation of the optical signal.

4. The fiber-optic gyrometer as claimed in claim 2, wherein the modulation signal Um applied to the phase modulator generates the phase ramp, with a slope proportional to $(\phi_o/t_0)$ and a peak-to-peak amplitude equal to $2\pi$ radians, which is combined with the phase modulation signal $+\pi/2$ and $-\pi/2$ with the frequency $\frac{1}{2}t_0$.

5. The fiber-optic gyrometer as claimed in claim 1, further including a synchronous detection circuit formed by the first sampling circuit and the second sampling circuit both connected to the differential amplifier, the first sampling circuit and the second sampling circuit being sample-and-hold circuits, the synchronous detection circuit driven by two complementary control signals Ca and Cb with the modulation frequency $FO=1/(2t_o)$, which are controlled by the clock that provide complementary logical states H and $\overline{H}$, through an invertor, so that the output signal Ud of the adaptor is sampled by the first sample-and-hold circuit during one half-period $t_o$ of the phase modulation of the optical signal, then by the second sample-and-hold circuit during subsequent half-period of the phase modulation of the optical signal.

6. The fiber-optic gyrometer as claimed in claim 5, wherein the modulation signal Um applied to the phase modulator generates the phase ramp, with a slope proportional to $(\phi_o/t_0)$ and a peak-to-peak amplitude equal to $2\pi$ radians, which is combined with the phase modulation signal $+\pi/2$ and $-\pi/2$ with the frequency $\frac{1}{2}t_o$.

7. The fiber-optic gyrometer as claimed in claim 5, wherein the digital control circuit includes an adder/subtractor which receives, on inputs, the output digital signals of the analog-digital converter and an accumulation instruction with the frequency FO and provides, at its output, digital information to an integrator tasked with producing a digital ramp whose slope is a function of the speed of rotation of the gyrometer, the digital output of integrator addressing a digital/analog converter which, through a power amplifier, generates the analog voltage Um for modulation of the phase-shifter arranged in the path of the light waves of the interferometer.

8. The fiber-optic gyrometer as claimed in claim 5, wherein each of the sample-and-hold circuits of a synchronous detection circuit has control inputs Ea, $\overline{Ea}$ and Eb, $\overline{Eb}$ driven by the clock through the invertor, one output Ca of the invertor being connected respectively to the input $\overline{Ea}$ of the first sample-and-hold circuit and to the input Eb of the second, and the output Cb of the invertor being connected to the input Ea of the first sample-and-hold circuit and to the input $\overline{Eb}$ of the second, the sample which is held being the analog value present at the input of the inputs Ea and Eb, the signal presented to the input of the analog/digital converter when controlling the analog/digital conversion being the difference between the values sampled during the last leading edges of the signals at the inputs Ea and Eb.

9. The fiber-optic gyrometer as claimed in claim 8, wherein the invertor receives through its control input an inversion control signal Co with the frequency f, which has a high state during a half-period of duration f/2 then a low state during the subsequent half-period of the same duration, and in that states H and $\overline{H}$ are transmitted respectively to the outputs Ca and Cb of the invertor when the inversion control signal is in the high state, the output Ca transmitting the state H of the clock and the output Cb transmitting the state $\overline{H}$, and the states H and $\overline{H}$ are inverted at the outputs Ca and Cb of the invertor when the inversion control signal is in the low state, the output Ca transmitting the state $\overline{H}$ of the clock and the output Cb transmitting the state H.

10. The fiber-optic gyrometer as claimed in claim 8, wherein the digital control circuit includes an adder/subtractor which receives, on inputs, the output digital signals of the analog-digital converter and an accumulation instruction with the frequency FO and provides, at its output, digital information to an integrator tasked with producing a digital ramp whose slope is a function of the speed of rotation of the gyrometer, the digital output of integrator addressing a digital/analog converter which, through a power amplifier, generates the analog voltage Um for modulation of the phase-shifter arranged in the path of the light waves of the interferometer.

11. The fiber-optic gyrometer as claimed in claim 5, wherein the invertor receives through its control input an inversion control signal Co with the frequency f, which has a high state during a half-period of duration f/2 then a low state during the subsequent half-period of the same duration, and in that states H and $\overline{H}$ are transmitted respectively to the outputs Ca and Cb of the invertor when the inversion control signal is in the high state, the output Ca transmitting the state H of the clock and the output Cb transmitting the state $\overline{H}$, and the states H and $\overline{H}$ are inverted at the outputs Ca and Cb of the invertor when the inversion control signal is in the low state, the output Ca transmitting the state $\overline{H}$ of the clock and the output Cb transmitting the state H.

12. The fiber-optic gyrometer as claimed in claim 11, wherein the modulation signal Um applied to the phase modulator generates the phase ramp, with a slope proportional to $(\phi_o/t_0)$ and a peak-to-peak amplitude equal to $2\pi$ radians, which is combined with the phase modulation signal $+\pi/2$ and $-\pi/2$ with the frequency $½t_0$.

13. The fiber-optic gyrometer as claimed in claim 1, wherein the modulation signal Um applied to a phase modulator generates a phase ramp, with a slope proportional to $(\Delta\phi_o/t_0)$, $\Delta\phi_o$ being a phase shift due to the non-reciprocal effect, and a peak-to-peak amplitude equal to $2\pi$ radians, which is combined with phase modulation signal $+\pi/2$ and $-\pi/2$ with the frequency $1/(2t_0)$.

14. The fiber-optic gyrometer as claimed in claim 13, wherein in order to correct the scale factor of the phase ramp of signal $U_m$, an operating device of the gyrometer includes four sample-and-hold circuits, a first group of two sample-and-hold circuits addressing the two inputs of a first differential amplifier, an assembly forming a first synchronous detector, the first differential amplifier providing the difference of the samples taken by the first group of sample-and-hold circuits, and a second group of two other sample-and-hold circuits addressing the two inputs of a second differential amplifier, the assembly forming a second synchronous detector, the second differential amplifier providing the difference of the samples taken by the second group of sample-and-hold circuits, the first and second groups of sample-and-hold circuits being respectively driven by a first clock and a second clock through respective invertors of the states of the clocks, the processor simultaneously controlling the following, depending on whether it is operating with a phase modulation interval of $\pi/2$ or $3\pi/2$:
- a first switch which selects either the output of the first differential amplifier of the first group of sample-and-hold circuits, or the output of the second differential amplifier of the second group of sample-and-hold circuits, in order to address the analog-digital converter of the electronic operating device;
- the clock and the state invertor which are associated with the selected group of sample-and-hold circuits;
- a second switch, of the same type as the first switch, which provides information to the digital/analog converter on the basis of the output information G1 and G2 of the first and second groups of sample-and-hold circuits.

15. The fiber-optic gyrometer as claimed in claim 13, wherein the digital control circuit includes an adder/subtractor which receives, on inputs, the output digital signals of the analog-digital converter and an accumulation instruction with the frequency FO and provides, at its output, digital information to an integrator tasked with producing a digital ramp whose slope is a function of the speed of rotation of the gyrometer, the digital output of integrator addressing a digital/analog converter which, through a power amplifier, generates the analog voltage Um for modulation of the phase-shifter arranged in the path of the light waves of the interferometer.

16. The fiber-optic gyrometer as claimed in claim 1, wherein a processor manages gyrometer, providing the control signals Ca and Cb necessary for controlling a synchronous detector.

17. The fiber-optic gyrometer as claimed in claim 1, further including a synchronous detection circuit driven by two complementary control signals Ca and Cb with the modulation frequency $FO-1/(2t_0)$, the synchronous detector including a first sample-and-hold circuit and a second sample-and-hold circuit which are controlled by the clock, through an invertor of the complementary logical states H and $\overline{H}$ provided by the clock, so that the output signal Ud of the adaptor is sampled by the first sample-and-hold circuit during one half-period $t_o$ of the phase modulation of the optical signal one half-period $t_o$, then by the second sample-and-hold circuit during the other, subsequent half-period of the phase modulation of the optical signal.

18. The fiber-optic gyrometer as claimed in claim 1, wherein each of the sample-and-hold circuits of a synchronous detection circuit has control inputs Ea, $\overline{Ea}$ and Eb, $\overline{Eb}$ driven by the clock through the invertor, one output Ca of the invertor being connected respectively to the input $\overline{Ea}$ of the first sample-and-hold circuit and to the input Eb of the second, and the output Cb of the invertor being connected to the input Ea of the first sample-and-hold circuit and to the input $\overline{Eb}$ of the second, the sample which is held being the analog value present at the input of the inputs Ea and Eb, the signal presented to the input of the analog/digital converter when controlling the analog/digital conversion being the difference between the values sampled during the last leading edges of the signals at the inputs Ea and Eb.

19. The fiber-optic gyrometer as claimed in claim 1, wherein control signals Ca and Cb are copies of pulse signals of a clock driven by a quartz oscillator of the processor.

20. The fiber-optic gyrometer as claimed in claim 19, wherein in order to correct the scale factor of the phase ramp, the operating device of the gyrometer includes four sample-and-hold circuits, a first group of two sample-and-hold circuits addressing the two inputs of a first differential amplifier, the assembly forming a first synchronous detector, the first differential amplifier providing the difference of the samples taken by the first group of sample-and-hold circuits, and a second group of two other sample-and-hold circuits addressing the two inputs of a second differential amplifier, the assembly forming a second synchronous detector, the second differential amplifier providing the difference of the samples taken by the second group of sample-and-hold circuits, the first and second groups of sample-and-hold circuits being respectively driven by a first clock and a second clock through respective invertors of the states of the clocks, the processor simultaneously controlling the following, depending on whether it is operating with a phase modulation interval of $\pi/2$ or $\pi 3\pi/2$:

a first switch which selects either the output of the first differential amplifier of the first group of sample-and-hold circuits, or the output of the second differential amplifier of the second group of sample-and-hold circuits, in order to address the analog-digital converter of the electronic operating device;

the clock and the state invertor which are associated with the selected group of sample-and-hold circuits;

a second switch, of the same type as the first switch, which provides information to the digital/analog converter on the basis of the output information G1 and G2 of the first and second groups of sample-and-hold circuits.

* * * * *